United States Patent
Sun et al.

(10) Patent No.: US 12,086,118 B2
(45) Date of Patent: Sep. 10, 2024

(54) CHAINING VERSION DATA BI-DIRECTIONALLY IN DATA PAGE TO AVOID ADDITIONAL VERSION DATA ACCESSES

(71) Applicant: International Business Machines Corporation, Armonk, NY (US)

(72) Inventors: Sheng Yan Sun, BeiJing (CN); Shuo Li, Beijing (CN); Xiaobo Wang, Beijing (CN); Xiao Ming Ma, Xi'an (CN)

(73) Assignee: International Business Corporation Machines, Armonk, NY (US)

( * ) Notice: Subject to any disclaimer, the term of this patent is extended or adjusted under 35 U.S.C. 154(b) by 0 days.

(21) Appl. No.: 17/526,207

(22) Filed: Nov. 15, 2021

(65) Prior Publication Data
US 2023/0153282 A1  May 18, 2023

(51) Int. Cl.
| | |
|---|---|
| *G06F 16/00* | (2019.01) |
| *G06F 16/21* | (2019.01) |
| *G06F 16/22* | (2019.01) |
| *G06F 16/23* | (2019.01) |
| *G06F 16/2455* | (2019.01) |

(52) U.S. Cl.
CPC ............ *G06F 16/219* (2019.01); *G06F 16/22* (2019.01); *G06F 16/2358* (2019.01); *G06F 16/24562* (2019.01)

(58) Field of Classification Search
None
See application file for complete search history.

(56) References Cited

U.S. PATENT DOCUMENTS

| | | | | |
|---|---|---|---|---|
| 8,521,776 B2* | 8/2013 | Ben-Itzhak | ......... | G06F 16/2477 707/781 |
| 9,275,095 B2* | 3/2016 | Bhattacharjee | ..... | G06F 16/1744 |

(Continued)

FOREIGN PATENT DOCUMENTS

| | | | |
|---|---|---|---|
| CN | 105335220 A | * | 2/2016 |
| CN | 109933564 A | | 6/2019 |

(Continued)

OTHER PUBLICATIONS

"Simple generational garbage collection and fast allocation", Andrew W. Appel (Year: 1989).*

(Continued)

*Primary Examiner* — Jean M Corrielus
(74) *Attorney, Agent, or Firm* — Shackelford, McKinley & Norton, LLP; Robert A. Voigt, Jr.

(57) ABSTRACT

A computer-implemented method, system and computer program product for improving performance of a distributed database. A query is received to store version data in the distributed database. Upon receiving the query to store the version data, the version data is stored in a row of a data page of a main table of a heap organized table/index organized table of the distributed database, where the row of the data page of the main table of the heap organized table/index organized table of the distributed database contains a pointer pointing to a later/previous version of the version data if the later/previous version of the version data is stored in the data page thereby chaining version data bi-directionally.

20 Claims, 10 Drawing Sheets

(56) References Cited

U.S. PATENT DOCUMENTS

| | | | |
|---|---|---|---|
| 9,514,007 B2* | 12/2016 | Gupta | G06F 16/23 |
| 9,626,404 B2 | 4/2017 | Aguilera et al. | |
| 9,684,686 B1* | 6/2017 | Morley | G06F 16/22 |
| 9,946,735 B2* | 4/2018 | Kharatishvili | G06F 16/27 |
| 11,080,334 B1 | 8/2021 | Esch | |
| 11,455,288 B2* | 9/2022 | Jang | G06F 16/2365 |
| 2002/0103815 A1* | 8/2002 | Duvillier | G06F 16/22 |
| | | | 707/999.203 |
| 2005/0251521 A1* | 11/2005 | Laber | G06F 16/219 |
| 2006/0074956 A1* | 4/2006 | Marwah | G06F 16/22 |
| 2007/0088766 A1* | 4/2007 | Bodge | G06F 16/219 |
| | | | 707/999.203 |
| 2009/0063548 A1* | 3/2009 | Rusher | G06F 16/219 |
| | | | 707/999.102 |
| 2010/0145996 A1* | 6/2010 | Ben-Itzhak | G06F 16/2477 |
| | | | 707/E17.007 |
| 2012/0066228 A1* | 3/2012 | Charboneau | G06F 16/22 |
| | | | 707/741 |
| 2014/0279929 A1* | 9/2014 | Gupta | G06F 11/1451 |
| | | | 707/683 |
| 2015/0039559 A1* | 2/2015 | Bhattacharjee | G06F 16/219 |
| | | | 707/625 |
| 2015/0039573 A1* | 2/2015 | Bhattacharjee | G06F 16/1744 |
| | | | 707/693 |
| 2015/0178329 A1* | 6/2015 | Andrei | G06F 16/2343 |
| | | | 707/695 |
| 2015/0261805 A1* | 9/2015 | Lee | G06F 16/2329 |
| | | | 707/703 |
| 2016/0048554 A1* | 2/2016 | Chen | G06F 16/27 |
| | | | 707/634 |
| 2016/0171226 A1 | 6/2016 | Wu et al. | |
| 2016/0217163 A1* | 7/2016 | Thakur | G06F 16/219 |
| 2017/0091226 A1* | 3/2017 | Kharatishvili | G06F 16/22 |
| 2019/0251068 A1* | 8/2019 | Thakur | G06F 16/219 |
| 2019/0317929 A1* | 10/2019 | Thakur | G06F 16/219 |
| 2020/0327114 A1* | 10/2020 | Gupta | G06F 16/2365 |
| 2020/0372004 A1* | 11/2020 | Barber | G06F 7/08 |
| 2021/0026561 A1 | 1/2021 | Ginzburg et al. | |
| 2021/0097051 A1* | 4/2021 | Cohen | G06F 16/2343 |
| 2021/0294785 A1* | 9/2021 | Jang | G06F 16/2322 |

FOREIGN PATENT DOCUMENTS

| | | | | |
|---|---|---|---|---|
| CN | 110196856 A | * | 9/2019 | G06F 16/2329 |
| WO | 0248919 A1 | | 6/2002 | |

OTHER PUBLICATIONS

International Search Report and the Written Opinion of the International Searching Authority for International Application No. PCT/CN2022/129929 dated Jan. 18, 2023, pp. 1-10.

* cited by examiner

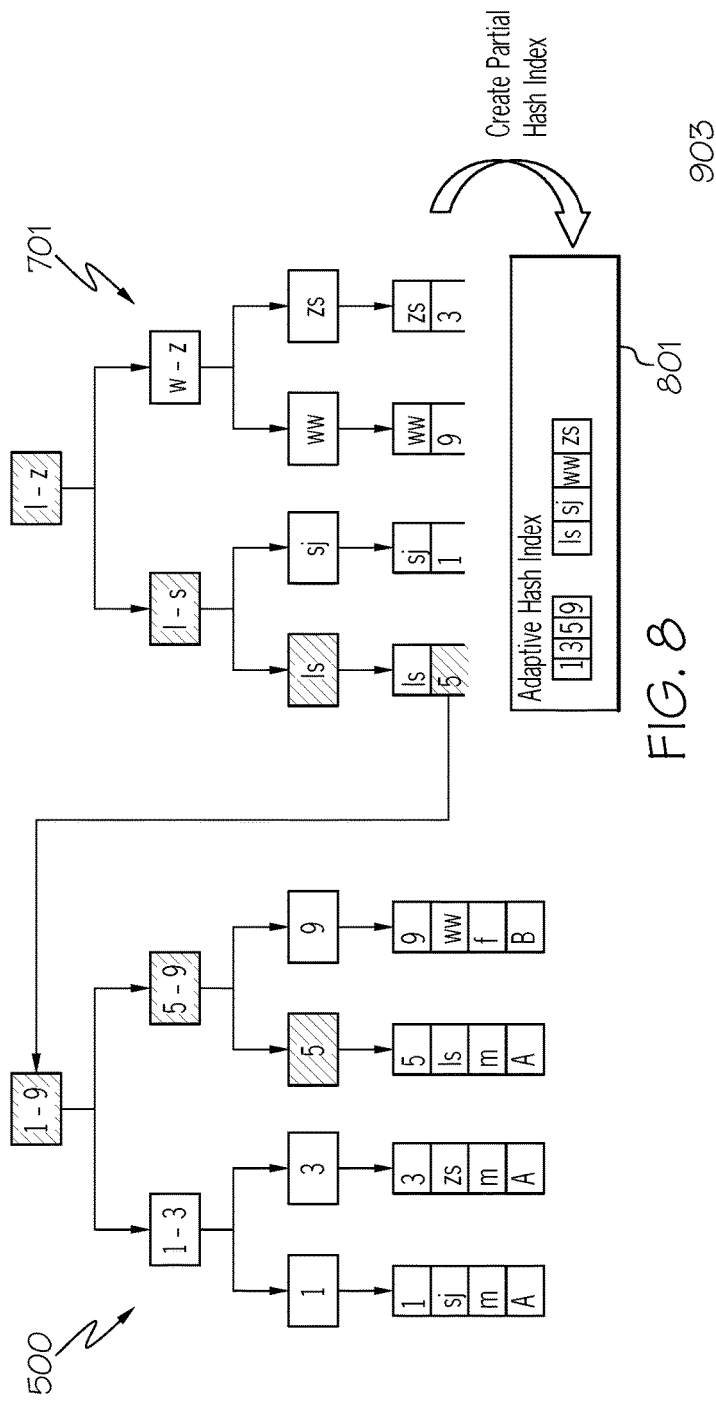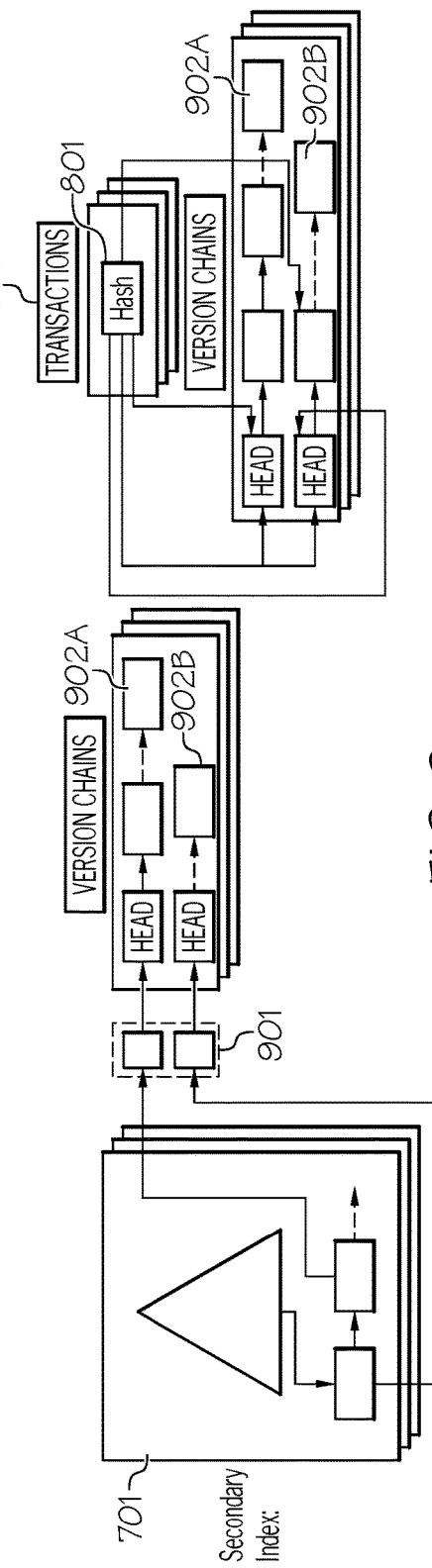
FIG. 8
FIG. 9

CHAINING VERSION DATA BI-DIRECTIONALLY IN DATA PAGE TO AVOID ADDITIONAL VERSION DATA ACCESSES

TECHNICAL FIELD

The present disclosure relates generally to distributed database systems, and more particularly to chaining version data bi-directionally in a data page of a main table of an organized table (e.g., index organized table, heap organized table) of the distributed database thereby avoiding additional version data accesses with synchronous input/output and network overhead.

BACKGROUND

A distributed database is an integrated collection of databases that is physically distributed across sites in a computer network. It may be stored in multiple computers located in the same physical location (e.g., a data center) or may be dispersed over a network of interconnected computers. Unlike parallel systems, in which the processors are tightly coupled and constitute a single database system, a distributed database system consists of loosely coupled sites that share no physical components.

In a distributed database system, system administrators can distribute collections of data (e.g., in a database) across multiple physical locations. A distributed database can reside on organized network servers or decentralized independent computers on the Internet, on corporate Intranets or Extranets, or on other organization networks. Because distributed databases store data across multiple computers, distributed databases may improve performance at end-user worksites by allowing transactions to be processed on many machines, instead of being limited to one.

Furthermore, in a distributed database system, a "database management system" functions as an interface between the end user and the database to facilitate the organization and manipulation of data. Additionally, in a distributed database system, "version control" may be implemented by a version control system to ensure collaborative sharing and editing among users of the data stored in the distributed database that employs different versions of the data. Such versioning is referred to herein as "database data versioning."

Any changes to the data are then tracked by the version control system, which are reflected by a version number which identifies the data that includes the changes made by that user.

Version control is important in a distributed database system as the data may undergo lots of revisions by a number of different users or contributors. These changes may not be immediately apparent, and without version control, it is difficult to track which changes are made to the data over a period of time.

Furthermore, database data versioning is used to improve efficiency and concurrency of data access to the database by avoiding the share-lock requirement. Locking is essential to successful transaction processing by the database management system (e.g., SQL server) and it is designed to allow the database management system to work seamlessly in a multi-user environment.

In a shared lock, when imposed, a page or row in the database will be reserved only for reading thereby preventing any other transaction to modify the locked record as long as the lock is active. However, a shared lock can be imposed by several transactions at the same time over the same page or row and in that way several transactions can share the ability for data reading since the reading process itself will not affect the actual or row data. In addition, a shared lock will allow write operations.

However, while such a shared-lock requirement is avoided by using database data versioning, database data versioning negatively affects the performance of the distributed database due to the additional and redundant read operations against the version data.

For example, in a distributed database system, each database may be associated with a database log (also referred to as a "transaction log"), which is a history of actions executed by the database management system with respect to that database. That is, the database log is a file that lists the changes to the database, which is stored in a stable storage format. If, after a start, the database is found in an inconsistent state or has not been shut down properly, the database management system reviews the database logs for uncommitted transactions and rolls back the changes made by these transactions. Additionally, all transactions that are already committed but whose changes were not yet materialized in the database are re-applied.

Unfortunately, database data versioning in such an environment negatively affects the performance of the distributed database due to the additional and redundant read operations against the version data, such as redundant read operations against multiple databases which may involve reading multiple logs with a certain rage specified.

Furthermore, the distributed database system may utilize a bitemporal table for the loaded version data when performing database data versioning. A bitemporal table is a table that combines the historical tracking of a system-period temporal table with the time-specific data storage capabilities of an application-period temporal table. However, a drawback with using such a bitemporal table is the required additional or double access against the bitemporal table, such as reading and writing to the bitemporal table. Furthermore, synchronous input/output may be needed.

Hence, by performing database data versioning in a distributed database system, additional and redundant read operations against the version data, additional or double access against a bitemporal table and/or synchronous input/output may be required thereby adversely affecting the performance of the distributed database system.

SUMMARY

In one embodiment of the present disclosure, a computer-implemented method for improving performance of a distributed database comprises receiving a query to store version data in the distributed database, where the distributed database comprises an integrated collection of databases that is physically distributed across sites in a computer network. The method further comprises storing the version data in a row of a data page of a main table of a heap organized table of the distributed database, where the row of the data page of the main table of the heap organized table of the distributed database contains a pointer pointing to a later version of the version data in response to the later version of the version data being stored in the data page thereby chaining version data bi-directionally.

In this manner, database data versioning may be performed in the distributed database system without adversely affecting the performance of the distributed database system by chaining the version data bi-directionally in the data page thereby avoiding additional version data accesses with synchronous input/output and network overhead.

In another embodiment of the present disclosure, a computer program product for improving performance of a distributed database comprises one or more computer readable storage mediums having program code embodied therewith, where the program code comprises programming instructions for receiving a query to store version data in the distributed database, where the distributed database comprises an integrated collection of databases that is physically distributed across sites in a computer network. The program code further comprises the programming instructions for storing the version data in a row of a data page of a main table of a heap organized table of the distributed database containing a pointer pointing to a later version of the version data thereby chaining version data bi-directionally.

In this manner, database data versioning may be performed in the distributed database system without adversely affecting the performance of the distributed database system by chaining the version data bi-directionally in the data page thereby avoiding additional version data accesses with synchronous input/output and network overhead.

Other forms of the embodiments of the computer-implemented method and computer program product described above are in a system.

In another embodiment of the present disclosure, a computer-implemented method for improving performance of a distributed database comprises receiving a query to store version data in the distributed database, where the distributed database comprises an integrated collection of databases that is physically distributed across sites in a computer network. The method further comprises storing the version data in a row of a data page of a main table of a primary index of an index organized table of the distributed database, where the row of the data page of the main table of the primary index of the index organized table of the distributed database contains a pointer pointing to a previous version of the version data in response to the previous version of the version data being stored in the data page thereby chaining version data bi-directionally.

In this manner, database data versioning may be performed in the distributed database system without adversely affecting the performance of the distributed database system by chaining the version data bi-directionally in the data page thereby avoiding additional version data accesses with synchronous input/output and network overhead.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 8 illustrates creating a partial hash index adaptively against secondary indexes in accordance with an embodiment of the present disclosure;

FIG. 9 illustrates identifying the particular version of the requested data in the version chains using the primary key value in the transaction in accordance with an embodiment of the present disclosure;

DETAILED DESCRIPTION

Figure 1:
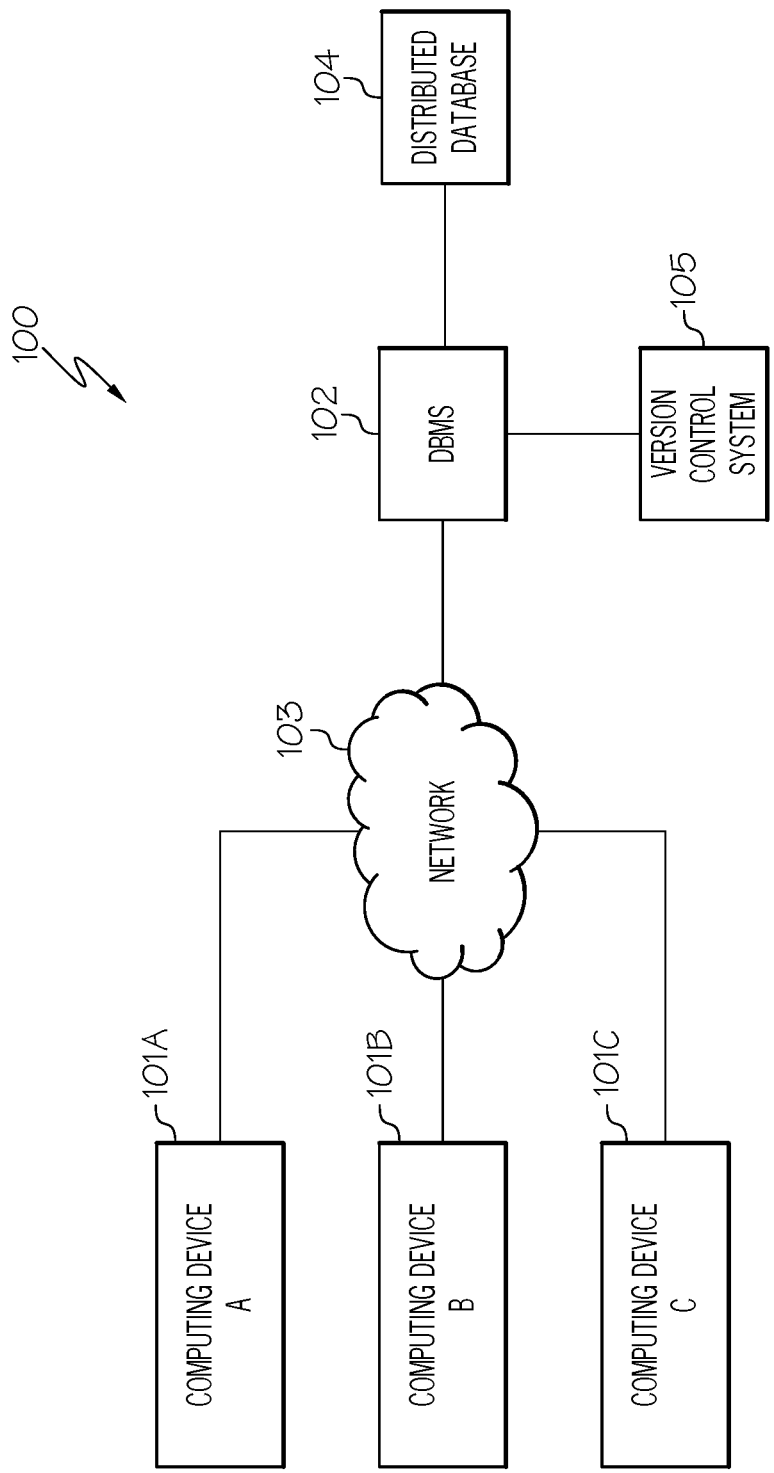
FIG. 1 illustrates a communication system for practicing the principles of the present disclosure in accordance with an embodiment of the present disclosure.

As stated in the Background section, by performing database data versioning in a distributed database system, additional and redundant read operations against the version data, additional or double access against a bitemporal table and/or synchronous input/output may be required thereby adversely affecting the performance of the distributed database system.

The embodiments of the present disclosure provide a means for performing database data versioning in a distributed database system without adversely affecting the performance of the distributed database system by chaining version data bi-directionally in a data page of a main table of an organized table (e.g., index organized table, heap organized table) of the distributed database thereby avoiding additional version data accesses with synchronous input/output and network overhead. A more detailed description of these and other features will be provided below.

In some embodiments of the present disclosure, the present disclosure comprises a computer-implemented method, system and computer program product for improving performance of a distributed database. In one embodiment of the present disclosure, a query (e.g., Structured Query Language (SQL) query) is received to store version data in the distributed database, where the distributed database includes an integrated collection of databases that is physically distributed across sites in a computer network. "Version data," as used herein, refers to data that has or possibly can have multiple versions. Upon receiving the query to store the version data, the version data is stored in a row of a data page of a main table of a heap organized table of the distributed database, where the row of the data page of the main table of the heap organized table of the distributed database contains a pointer pointing to a later version of the version data in response to the later version of the version data being stored in the data page thereby chaining version data bi-directionally. In this manner, database data versioning may be performed in the distributed database system without adversely affecting the performance of the distributed database system by chaining the version data bi-directionally in the data page thereby avoiding additional version data accesses with synchronous input/output and network overhead.

In another embodiment of the present disclosure, a query (e.g., Structured Query Language (SQL) query) is received to store version data in the distributed database, where the distributed database includes an integrated collection of databases that is physically distributed across sites in a computer network. Upon receiving the query to store the version data, the version data is stored in a row of a data page of a main table of a primary index of an index organized table of the distributed database, where the row of the data page of the main table of the primary index of the index organized table of the distributed database contains a pointer pointing to a previous version of the version data in response to the previous version of the version data being stored in the data page thereby chaining version data bi-directionally. In this manner, database data versioning may be performed in the distributed database system without adversely affecting the performance of the distributed database system by chaining the version data bi-directionally in the data page thereby avoiding additional version data accesses with synchronous input/output and network overhead.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes computing devices 101A-101C (identified as "Computing Device A," "Computing Device B," and "Computing Device C," respectively, in FIG. 1) connected to a database management system (DBMS) 102 (e.g., Structured Query Language (SQL) server) via a network 103. Computing devices 101A-101C may collectively or individually be referred to as computing devices 101 or computing device 101, respectively. It is noted that both computing devices 101 and the users of computing devices 101 may be identified with element number 101.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and database management system 102.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

In one embodiment, the user of computing device 101 issues a query (e.g., SQL query) to database management system 102 (e.g., SQL server) to update, delete and request information from distributed database 104, which is connected to database management system 102. For example, the user may issue the query of INSERT INTO to add a new row of data to a table in database 104. Such a query will be processed by database management system 102, such as storing and retrieving data as requested by the user. As a result, database management system 102 functions as an interface between the end user (e.g., user of computing device 101) and distributed database 104 to facilitate the organization and manipulation of data.

Distributed database 104 is an integrated collection of databases that is physically distributed across sites in a computer network. It may be stored in multiple computers located in the same physical location (e.g., a data center) or may be dispersed over a network of interconnected computers. Unlike parallel systems, in which the processors are tightly coupled and constitute a single database system, a distributed database system consists of loosely coupled sites that share no physical components.

In one embodiment, distributed database 104 stores version data. "Version data," as used herein, refers to data that has or possibly can have multiple versions. For example, data stored in distributed database 104 may be collaboratively shared and edited among the users of computing devices 101. As a result, such collaborative data may contain different versions of the data.

Furthermore, as shown in FIG. 1, system 100 includes a version control system 105 connected to database management system 102. In one embodiment, version control system 105 tracks changes to the data stored in distributed database 104, which are reflected by a version number which identifies the data that includes the changes made by that user (e.g., user of computing device 101). In one embodiment, version control system 105 ensures collaborative sharing and editing among users of the data stored in distributed database 104 that employs different versions of the data. Such versioning is referred to herein as "database data versioning."

In one embodiment, version control system 105 is configured to implement database data versioning in a distributed database system without adversely affecting the performance of the distributed database system by chaining version data bi-directionally in a data page of a main table of an organized table (e.g., index organized table, heap organized table) of distributed database 104 thereby avoiding additional version data accesses with synchronous input/output and network overhead. A more detailed description of these and other features will be provided below. Furthermore, a description of the software components of version control system 105 is provided below in connection with FIG. 2 and a description of the hardware configuration of version control system 105 is provided further below in connection with FIG. 3.

System 100 is not to be limited in scope to any one particular network architecture. System 100 may include any number of computing devices 101, database management systems 102, networks 103, distributed databases 104 and version control systems 105.

A discussion regarding the software components used by version control system 105 for performing database data versioning in a distributed database system without adversely affecting the performance of the distributed database system is provided below in connection with FIG. 2.

Figure 2:
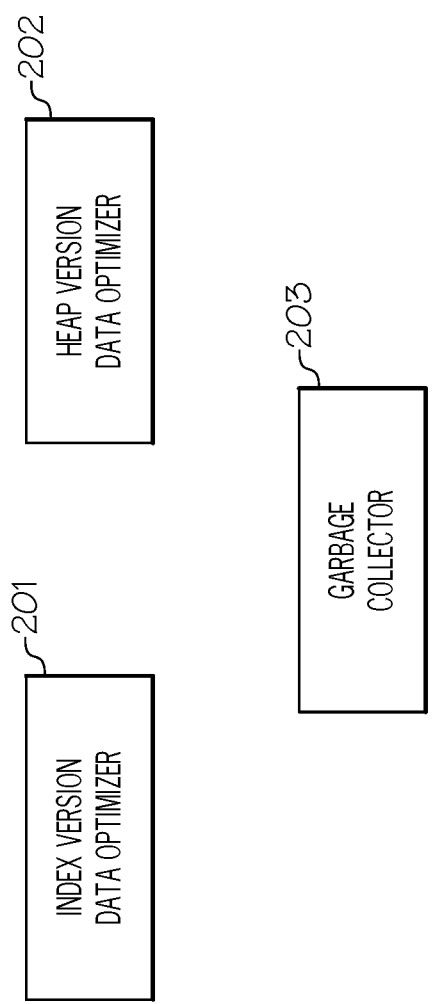
FIG. 2 is a diagram of the software components of the version control system for performing database data versioning in a distributed database system without adversely affecting the performance of the distributed database system in accordance with an embodiment of the present disclosure.

FIG. 2 is a diagram of the software components of version control system 105 (FIG. 1) for performing database data versioning in a distributed database system without adversely affecting the performance of the distributed database system in accordance with an embodiment of the present disclosure.

Referring to FIG. 2, in conjunction with FIG. 1, version control system 105 includes an index version data optimizer 201 which performs version data optimization in an index organized table. An "index organized table," as used herein, refers to a storage organization that is a variant of a primary B-tree. Unlike an ordinary (heap organized) table whose data is stored as an unordered collection (heap), data for an index organized table is stored in a B-tree index structure in a primary key sorted manner. Each leaf block in the index structure stores both the key and non-key columns.

In one embodiment, the B-tree index structure of the index organized table includes a root node with non-leaf pages located one or more levels below the root nodes and with leaf pages being the children of the non-leaf pages. In one embodiment, such leaf pages store both the key and non-key columns as discussed above. In one embodiment, such a structure may be referred to herein as the "primary index."

In one embodiment, index version data optimizer 201 stores version data in the rows of the data page (leaf page discussed above) of the main table of the primary index of the index organized table, where such rows may contain pointers to a previous version of the version data if the previous version of the version data is stored in the data page thereby chaining version data bi-directionally.

Furthermore, in one embodiment, index version data optimizer 201 replaces the row identifier in the secondary index with the primary key value, which points to the beginning of the version chain, to avoid secondary index modification during version data generation. A "secondary index," as used herein, refers to an index that typically processes a segment type in a sequence other than the one that is defined by the segment's key. That is, a secondary index typically enables one to efficiently access records in the primary index by means of some piece of information other than the primary key. Furthermore, in one embodiment, the primary index does not contain duplicates; however, the secondary index may have duplicates.

As stated above, index version data optimizer 201 replaces the row identifier in the secondary index with the primary key value, which points to the beginning of the version chain, to avoid secondary index modification during version data generation. A "version chain," as used herein, refers to a chain of various versions of the same data, such as version 1, version 2, version 3, . . . version N, where N is a positive integer number, of the same data.

Additionally, in one embodiment, index version data optimizer 201 creates a partial hash index adaptively against the secondary index(es) so as to point to particular versions in the version chains. In one embodiment, the partial hash index is created based on frequently accessed data thereby avoiding the double index probe (probe operation to retrieve rows of data from both the primary and secondary indexes) for the secondary index and the primary index to improve index access efficiency. As a result, the partial hash index contains entries pertaining to a portion of the primary index.

In one embodiment, as a result of building the partial hash index, a transaction to read version data in the main table may be addressed by using the primary key value in the transaction in connection with the partial hash index to point to a particular version of the requested data in the version chains. A "transaction" is used to interact with the data in a database, such as distributed database 104. Whenever data is read or written to distributed database 104, it is performed using a transaction. A "transaction," as used herein, refers to an atomic and durable set of data access and data mutation operations.

Version control system 105 further includes a heap version data optimizer 202 which performs version data optimization in a heap organized table. A "heap organized table," as used herein, refers to a table with rows stored in no particular order. A heap is a table without a clustered index as opposed to an index organized table (clustered index corresponds to the primary index of the index organized table). One or more non-clustered indexes may be created on tables stored as a heap.

In one embodiment, heap version data optimizer 202 stores version data in the rows of the data page of the main table of the heap organized table of distributed database 104, where such rows may contain pointers to a later version of the version data if the later version of the version data is stored in the data page thereby chaining version data bi-directionally.

In one embodiment, heap version data optimizer 202 compares a minimum active version of the version data with a current version of the version data to avoid duplicate fetches. The "minimum active version of the version data," as used herein, refers to the lowest version number of the version data that has active transactions. "Active transactions," as used herein, refer to transactions that are currently reading or writing to such version data. The "current version," as used herein, refers to the version of the version data that is currently being pointed by the page header of the data page.

For example, if versions 1 and 2 of the version data do not have any active transactions (i.e., no transactions are currently reading or writing to such version data) and version 3 of the version data does have active transactions (i.e., one or more transactions are currently reading or writing to such version data), then version 3 of the version data would correspond to the minimum active version of the version data. Such a version would then be compared with the current version of the version data (i.e., the version of the version data that is currently being pointed by the page header of the data page).

If the current version of the version data is less than the minimum active version of the version data, then the history version data of the current version of the version data is purged by heap version data optimizer 202. Otherwise, the history version data of the current version of the version data is registered in a queue ("purge queue") to be purged by garbage collector 203, which performs the garbage collection task in the future as long as the purge rule is satisfied (i.e., current version of the version data is less than the minimum active version of the version data). In one embodiment, garbage collector 203 is responsible for purging these "registered" versions periodically as long as the purge rule is satisfied.

"History version data," as used herein, refers to the version data that is a prior version (i.e., older version) than the version data in question.

A further description of these and other functions is provided below in connection with the discussion of the method for improving the performance of distributed database 104 (FIG. 1) by performing database data versioning without adversely affecting the performance of distributed database 104.

Prior to the discussion of the method for improving the performance of distributed database 104 by performing database data versioning in distributed database 104 without adversely affecting the performance of distributed database 104, a description of the hardware configuration of version control system 105 (FIG. 1) is provided below in connection with FIG. 3.

Figure 3:
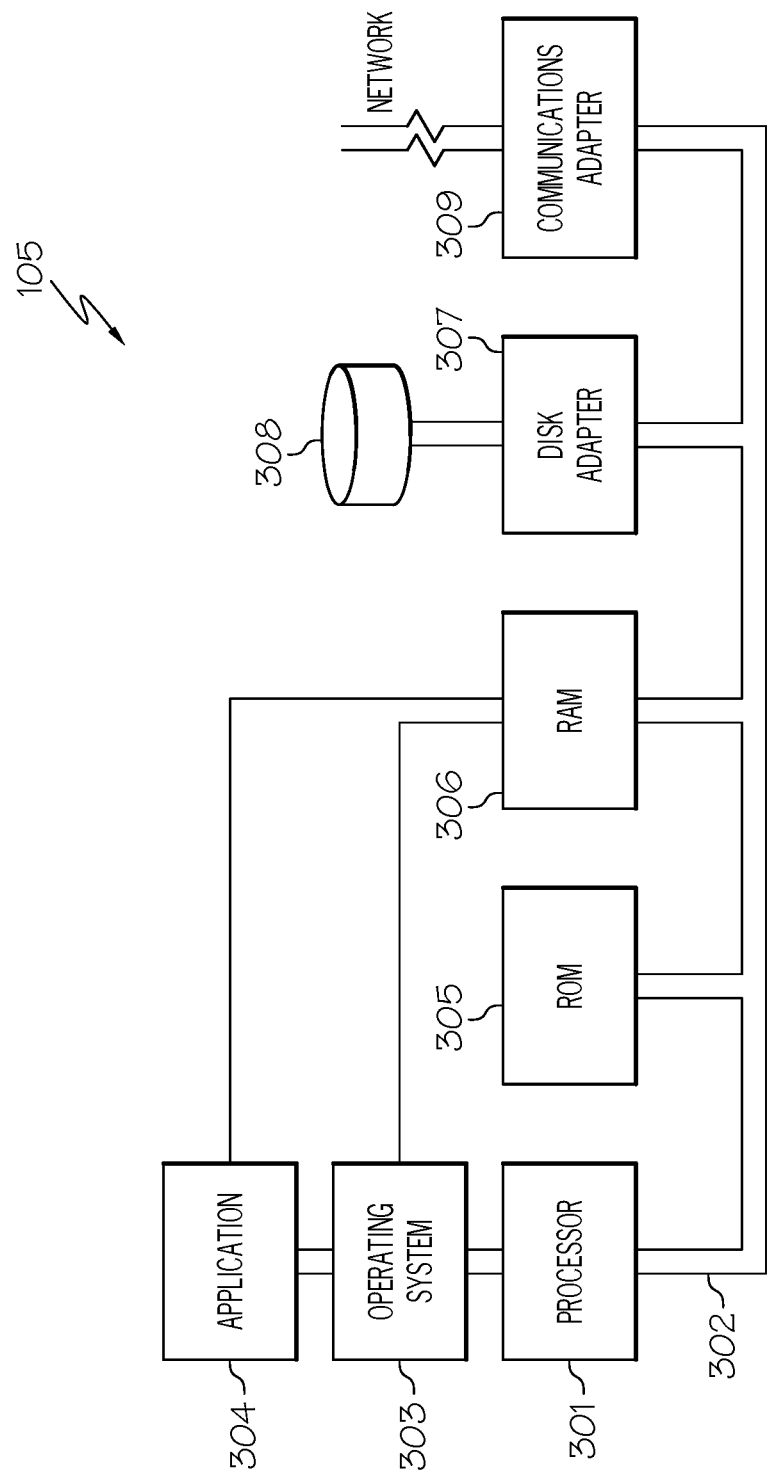
FIG. 3 illustrates an embodiment of the present disclosure of the hardware configuration of the version control system which is representative of a hardware environment for practicing the present disclosure.

Referring now to FIG. 3, FIG. 3 illustrates an embodiment of the present disclosure of the hardware configuration of version control system 105 (FIG. 1) which is representative of a hardware environment for practicing the present disclosure.

Version control system 105 has a processor 301 connected to various other components by system bus 302. An operating system 303 runs on processor 301 and provides control and coordinates the functions of the various components of FIG. 3. An application 304 in accordance with the principles of the present disclosure runs in conjunction with operating system 303 and provides calls to operating system 303 where the calls implement the various functions or services to be performed by application 304. Application 304 may include, for example, index version data optimizer 201 (FIG. 2), heap version data optimizer 202 (FIG. 2) and garbage collector 203 (FIG. 2). Furthermore, application 304 may include, for example, a program for improving the performance of distributed database 104 by performing database data versioning in distributed database 104 without adversely affecting the performance of distributed database 104 as discussed further below in connection with FIGS. 4-13.

Referring again to FIG. 3, read-only memory ("ROM") 305 is connected to system bus 302 and includes a basic input/output system ("BIOS") that controls certain basic functions of version control system 105. Random access memory ("RAM") 306 and disk adapter 307 are also connected to system bus 302. It should be noted that software components including operating system 303 and application 304 may be loaded into RAM 306, which may be version control system's 105 main memory for execution. Disk adapter 307 may be an integrated drive electronics ("IDE") adapter that communicates with a disk unit 308, e.g., disk drive. It is noted that the program for improving the performance of distributed database 104 by performing database data versioning in distributed database 104 without adversely affecting the performance of distributed database 104, as discussed further below in connection with FIGS. 4-13, may reside in disk unit 308 or in application 304.

Version control system 105 may further include a communications adapter 309 connected to bus 302. Communications adapter 309 interconnects bus 302 with an outside network (e.g., network 103 of FIG. 1) to communicate with other devices, such as computing devices 101 (FIG. 1).

In one embodiment, application 304 of version control system 105 includes the software components of index version data optimizer 201, heap version data optimizer 202 and garbage collector 203. In one embodiment, such components may be implemented in hardware, where such hardware components would be connected to bus 302. The functions discussed above performed by such components are not generic computer functions. As a result, version control system 105 is a particular machine that is the result of implementing specific, non-generic computer functions.

In one embodiment, the functionality of such software components (e.g., index version data optimizer 201, heap version data optimizer 202 and garbage collector 203) of version control system 105, including the functionality for improving the performance of distributed database 104 by performing database data versioning in distributed database 104 without adversely affecting the performance of distributed database 104, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, database data versioning in a distributed database system negatively affects the performance of the distributed database due to the additional and redundant read operations against the version data, such as redundant read operations against multiple databases which may involve reading multiple logs with a certain rage specified. Furthermore, the distributed database system may utilize a bitemporal table for the loaded version data when performing database data versioning. A bitemporal table is a table that combines the historical tracking of a system-period temporal table with the time-specific data storage capabilities of an application-period temporal table. However, a drawback with using such a bitemporal table is the required additional or double access against the bitemporal table, such as reading and writing to the bitemporal table. Furthermore, synchronous input/output may be needed. Hence, by performing database data versioning in a distributed database system, additional and redundant read operations against the version data, additional or double access against a bitemporal table and/or synchronous input/output may be required thereby adversely affecting the performance of the distributed database system.

Figure 4:
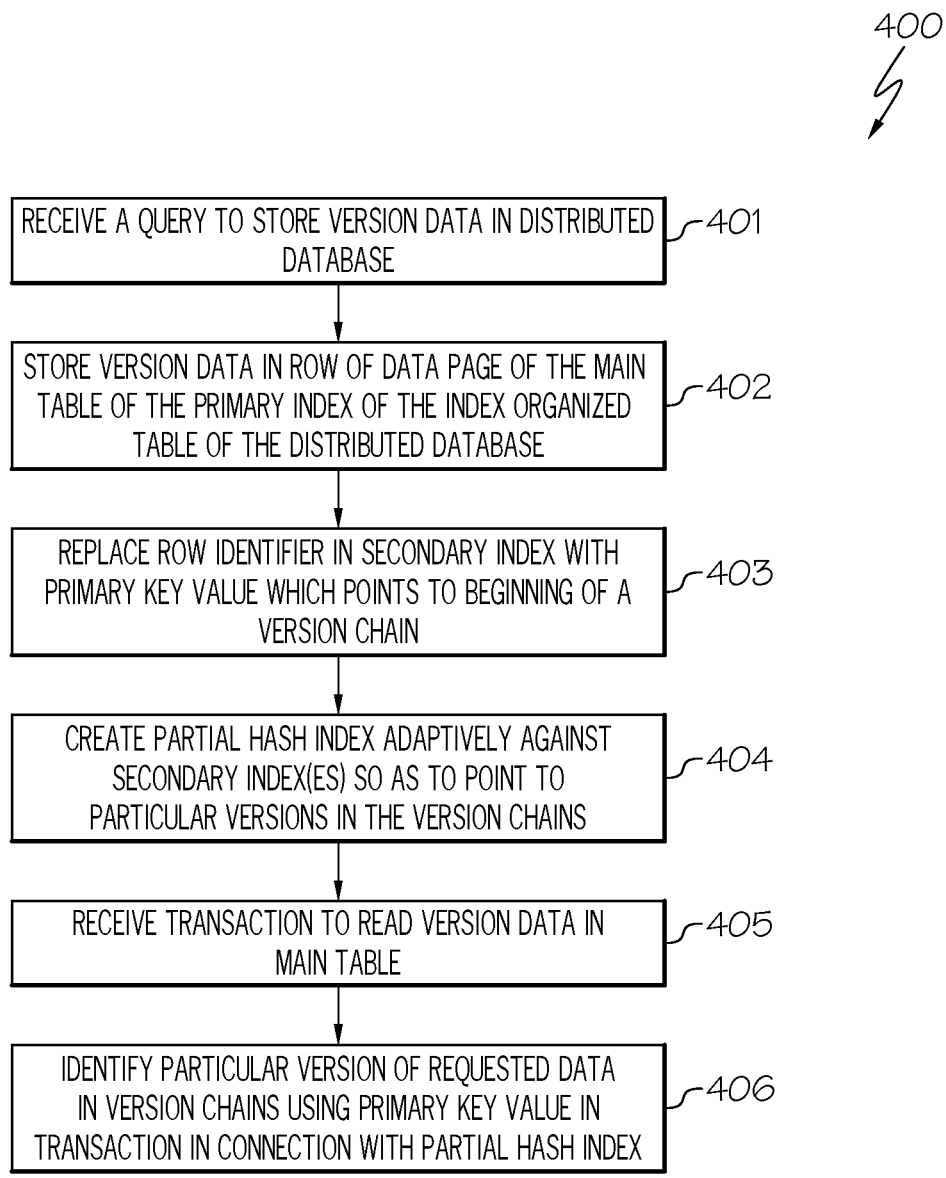
FIG. 4 is a flowchart of a method for improving performance of a distributed database by chaining version data bi-directionally in a data page of a main table of a primary index of an index organized table of the distributed database in accordance with an embodiment of the present disclosure.
Figure 5:
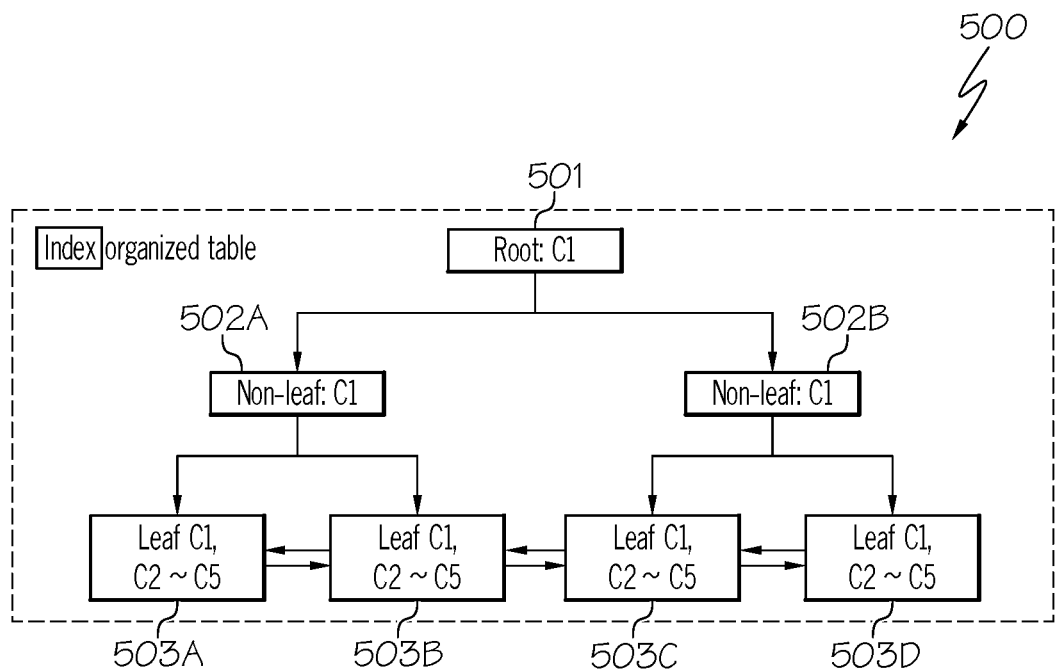
FIG. 5 illustrates an exemplary index organized table in accordance with an embodiment of the present disclosure.
Figure 6:
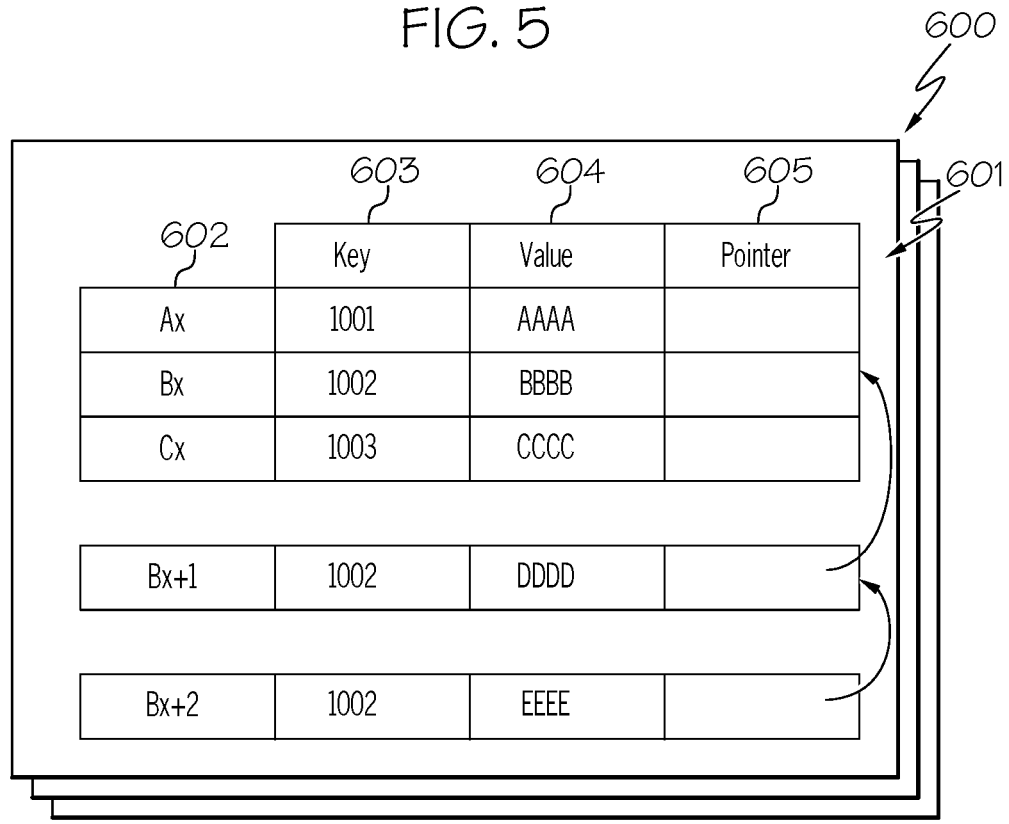
FIG. 6 illustrates an exemplary data page of the main table of the primary index of the index organized table of the distributed database in accordance with an embodiment of the present disclosure.
Figure 7:
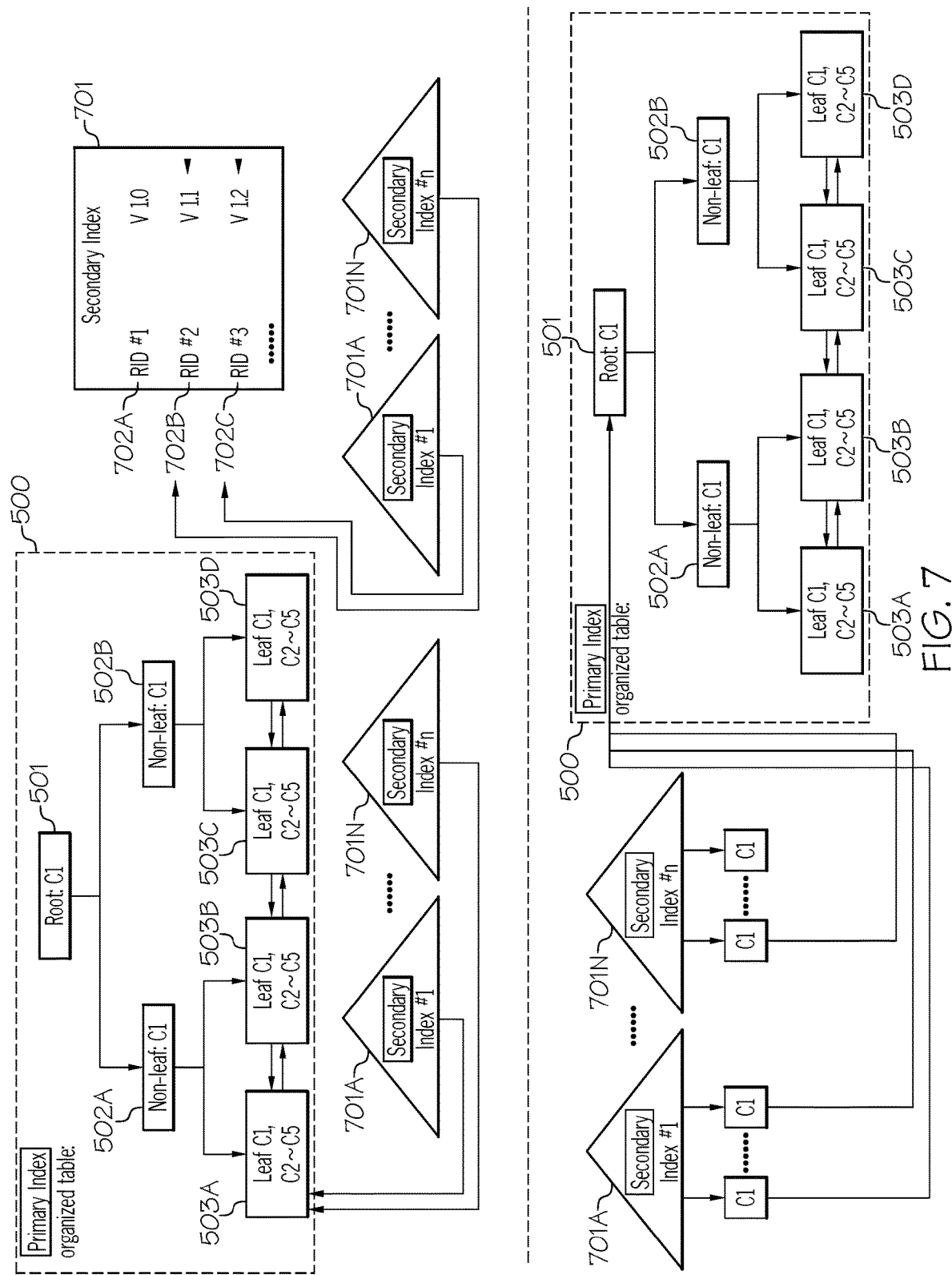
FIG. 7 illustrates an embodiment of the present disclosure of replacing the row identifier in a secondary index with a primary key value.
Figure 10:
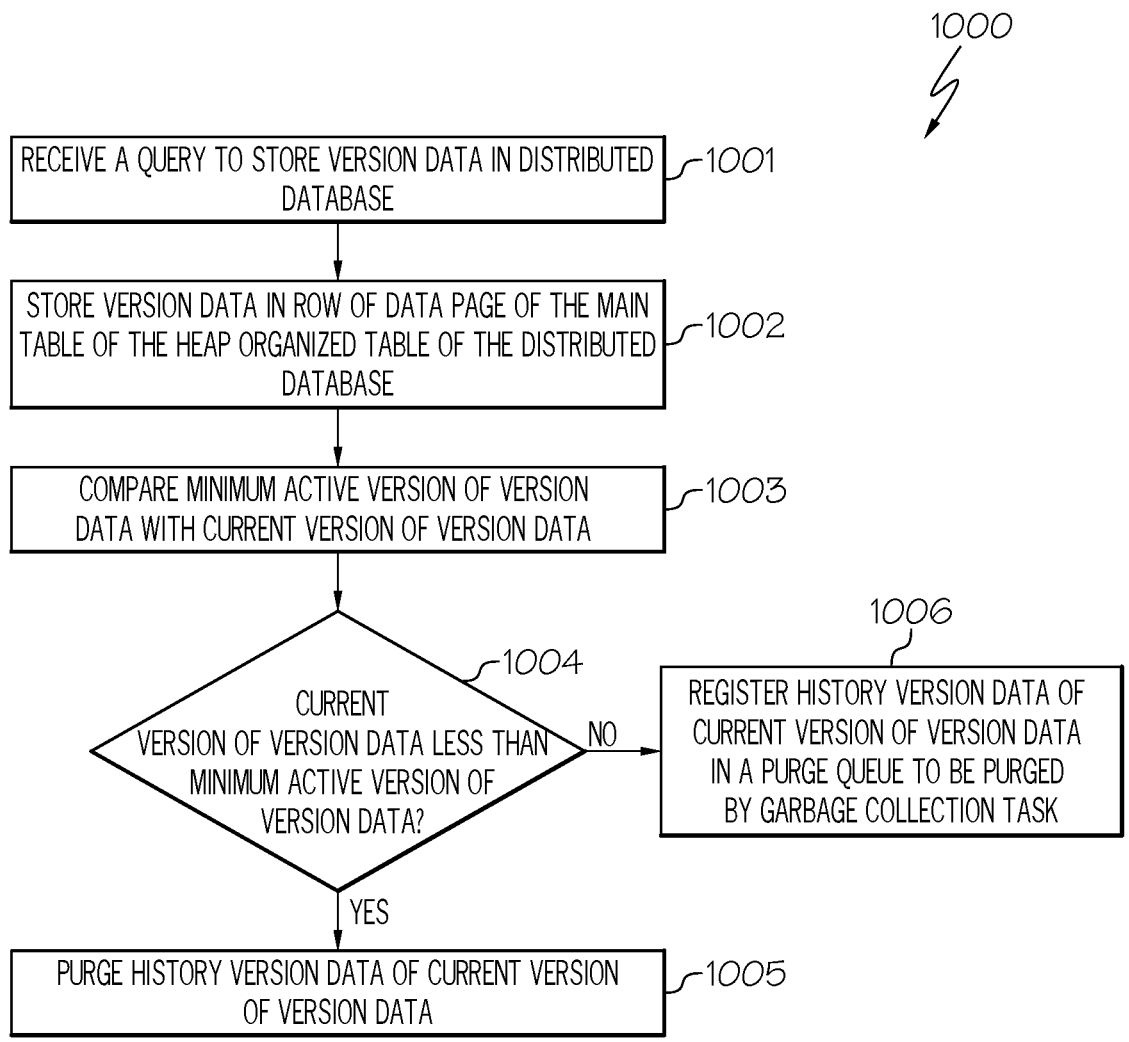
FIG. 10 is a flowchart of a method for improving performance of a distributed database by chaining version data bi-directionally in a data page of a main table of a heap organized table of the distributed database in accordance with an embodiment of the present disclosure.
Figure 11:
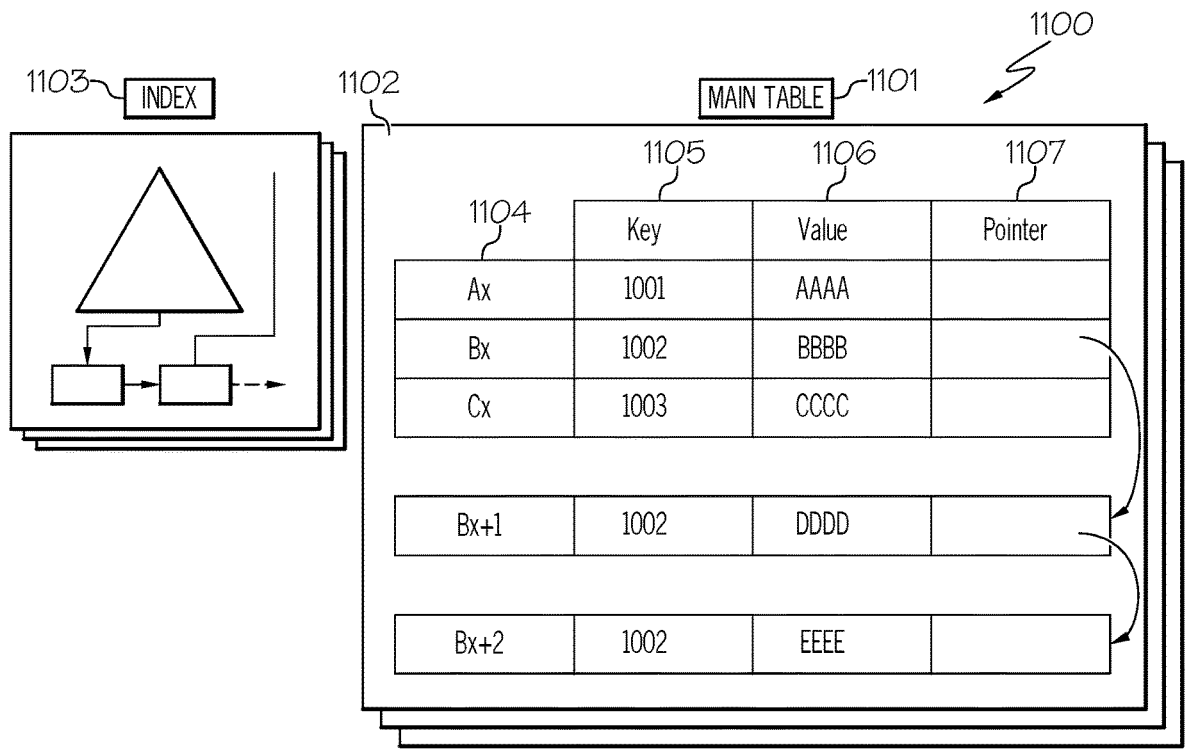
FIG. 11 illustrates an exemplary data page of the main table of the heap organized table of the distributed database in accordance with an embodiment of the present disclosure.
Figure 12:
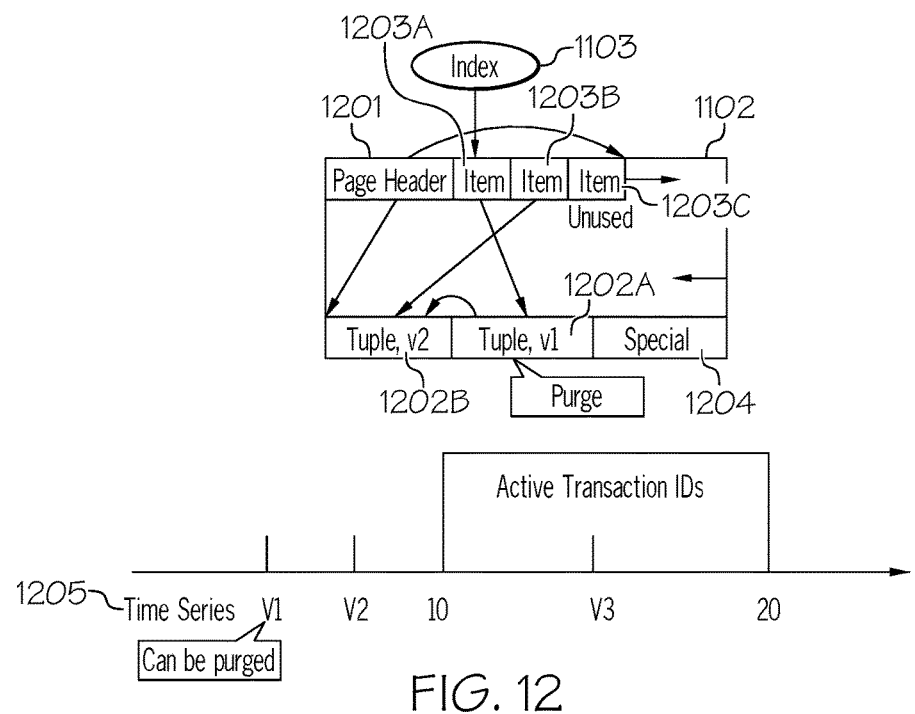
FIG. 12 illustrates purging the history version data of the current version of the version data in accordance with an embodiment of the present disclosure.
Figure 13:
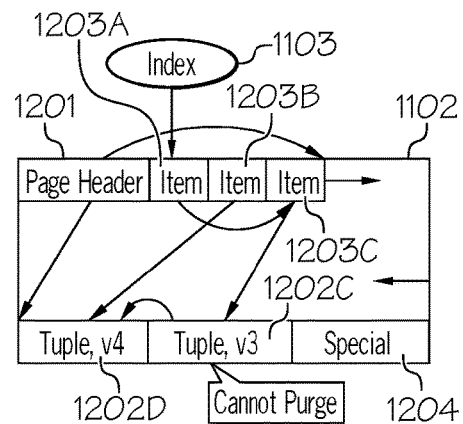
FIG. 13 illustrates registering the history version data of the current version of the version data in the purge queue in accordance with an embodiment of the present disclosure.
Figure 13:
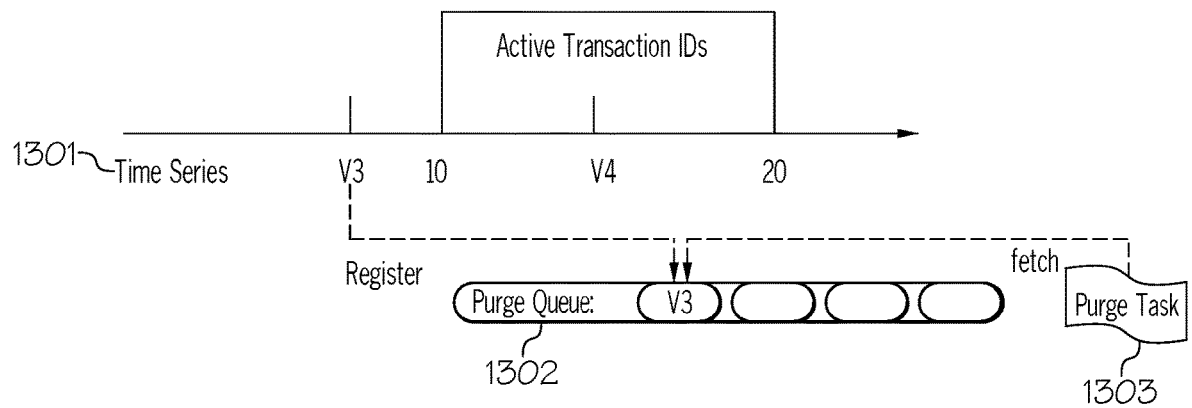

The embodiments of the present disclosure provide a means for performing database data versioning in a distributed database system without adversely affecting the performance of the distributed database system by chaining version data bi-directionally in a data page of a main table of an organized table (e.g., index organized table, heap organized table) of the distributed database thereby avoiding additional version data accesses with synchronous input/output and network overhead as discussed below in connection with FIGS. 4-13. FIG. 4 is a flowchart of a method for improving performance of a distributed database by chaining version data bi-directionally in a data page of a main table of a primary index of an index organized table of the distributed database. FIG. 5 illustrates an exemplary index organized table. FIG. 6 illustrates an exemplary data page of the main table of the primary index of the index organized table of the distributed database. FIG. 7 illustrates replacing the row identifier in a secondary index with a primary key value. FIG. 8 illustrates creating a partial hash index adaptively against secondary indexes. FIG. 9 illustrates identifying the particular version of the requested data in the version chains using the primary key value in the transaction. FIG. 10 is a flowchart of a method for improving performance of a distributed database by chaining version data bi-directionally in a data page of a main table of a heap organized table of the distributed database. FIG. 11 illustrates an exemplary data page of the main table of the heap organized table of the distributed database. FIG. 12 illustrates purging the history version data of the current version of the version data. FIG. 13 illustrates registering the history version data of the current version of the version data in the purge queue.

As stated above, FIG. 4 is a flowchart of a method 400 for improving performance of a distributed database by chaining version data bi-directionally in a data page of a main table of a primary index of an index organized table of the distributed database in accordance with an embodiment of the present disclosure.

Referring to FIG. 4, in conjunction with FIGS. 1-3, in operation 401, index version data optimizer 201 of version control system 105 receives a query, such as from the user of computing device 101, to store version data in distributed database 104. In one embodiment, such a query is a Structured Query Language (SQL) query.

As discussed above, "version data," as used herein, refers to data that has or possibly can have multiple versions. For example, data stored in distributed database 104 may be collaboratively shared and edited among the users of computing devices 101. As a result, such collaborative data may contain different versions of the data.

Furthermore, a "distributed database," as used herein, refers to an integrated collection of databases that is physically distributed across sites in a computer network.

In operation 402, index version data optimizer 201 of version control system 105 stores the version data in a row of the data page of the main table of the primary index of the index organized table of distributed database 104, where the row of the data page contains a pointer to a previous version of the version data if the previous version of the version data is stored in the data page thereby chaining the version data bi-directionally.

As stated above, an "index organized table," as used herein, refers to a storage organization that is a variant of a primary B-tree. Unlike an ordinary (heap organized) table whose data is stored as an unordered collection (heap), data for an index organized table is stored in a B-tree index structure in a primary key sorted manner. Each leaf block in the index structure stores both the key and non-key columns.

In one embodiment, the B-tree index structure of the index organized table includes a root node with non-leaf pages located one or more levels below the root nodes and with leaf pages being the children of the non-leaf pages. In one embodiment, such leaf pages store both the key and non-key columns as discussed above. In one embodiment, such a structure may be referred to herein as the "primary index organized table."

In one embodiment, index version data optimizer 201 stores version data in the rows of the data page (leaf page discussed above) of the main table of the primary index of the index organized table, where such rows may contain pointers to a previous version of the version data if the previous version of the version data is stored in the data page thereby chaining version data bi-directionally.

An example of such an index organized table is discussed below in connection with FIG. 5.

FIG. 5 illustrates an exemplary index organized table 500 in accordance with an embodiment of the present disclosure.

Referring to FIG. 5, index organized table 500 includes a root node 501 with non-leaf pages 502A-502B being children of root node 501. Furthermore, as shown in FIG. 5, leaf pages 503A-503B are children of non-leaf page 502A and leaf pages 503C-503D are children of non-leaf page 502B. Non-leaf pages 502A-502B may collectively or individually be referred to as non-leaf pages 502 or non-leaf page 502, respectively. Furthermore, leaf pages 503A-503D may collectively or individually be referred to as leaf pages 503 or leaf page 503, respectively.

As shown in FIG. 5, root node 501 and each non-leaf page 502 and leaf page 503 store a primary key, which is identified by "C1." Furthermore, as shown in FIG. 5, leaf pages 503 store the non-key columns, which are identified by "C2~C5."

While FIG. 5 illustrates two non-leaf pages 502 and four leaf pages 503, it is noted that index organized table 500 may include any number of non-leaf pages 502 and leaf pages 503.

As discussed above, index version data optimizer 201 of version control system 105 stores version data in the data page of the main table of the primary index of index organized table 500 of distributed database 104. An example of such a data page is discussed below in connection with FIG. 6.

FIG. 6 illustrates an exemplary data page 601 of the main table 600 of the primary index of index organized table 500 (FIG. 5) of distributed database 104 (FIG. 1) in accordance with an embodiment of the present disclosure.

Referring to FIG. 6, in conjunction with FIGS. 1 and 5, main table 600 of index organized table 500 includes multiple data pages in the primary index, including the data page 601 shown in FIG. 6, which is referred to herein as the "primary index organized data page 601."

As shown in FIG. 6, primary index organized data page 601 contains rows of entries, where each row contains entries to store the version data 602, a key 603, a value 604 and a pointer 605. In one embodiment, such version data 602 is associated with a key 603 (e.g., primary key) corresponding to a value stored in entry 604. In this manner, version data 602 may be identified by the query providing key 603. Furthermore, in certain situation, such version data 602 may include prior versions. In such cases, entry 605 stores a pointer to the prior version of the version data stored in that row of data page 601. For example, version data 602 Bx+1 that is identified by key 603 (1002) with the value 604 of DDDD has a pointer 605 that points to the prior version of such data (Bx) as shown in FIG. 6. Similarly, as shown in FIG. 6, version data 602 Bx+2 that is identified by key 603 (1002) with the value 604 of EEEE has a pointer 605 that points to the prior version of such data (Bx+1).

Returning to FIG. 4, in conjunction with FIGS. 1-3 and 5-6, in operation 403, index version data optimizer 201 of version control system 105 replaces the row identifier in a secondary index with a primary key value, which points to the beginning of a version chain, to avoid secondary index modification during version data generation as shown in FIG. 7.

FIG. 7 illustrates an embodiment of the present disclosure of replacing the row identifier in a secondary index with a primary key value.

Referring to FIG. 7, in conjunction with FIGS. 5 and 6, index organized table 500 (corresponds to the primary index of the index organized table) may be associated with one or more secondary indexes 701A-701N, where N is a positive integer number. Secondary indexes 701A-701N may collectively or individually be referred to as secondary indexes 701 or secondary index 701, respectively. A "secondary index" 701, as used herein, refers to an index that typically processes a segment type in a sequence other than the one that is defined by the segment's key. That is, secondary index 701 typically enables one to efficiently access records in the primary index by means of some piece of information other than the primary key. However, in embodiments of the present disclosure, the row identifiers of secondary indexes 701 are replaced with a primary key value, which points to the beginning of a version chain, to avoid secondary index modification during version data generation.

For example, as shown in FIG. 7, row identifiers 702A-702C (identified as row identifiers RID #1, RID #2 and RID #3, respectively, in FIG. 7) associated with the versions of 1.0, 1.1 and 1.2 of the version data are replaced with a primary key, such as "C1." Such a replacement is utilized in order to decouple the relationship between the secondary index row identifier and the table row data (row data of main table 600 of FIG. 6) to avoid secondary index modification during version data generation. Row identifiers 702A-702C may collectively or individually be referred to as a row identifiers 702 or row identifier 702. It is noted that each secondary index 701 may include any number of row identifiers 702.

As stated above, index version data optimizer 201 replaces row identifier 702 in the secondary index 701 with the primary key value, which points to the beginning of the version chain, to avoid secondary index modification during version data generation. A "version chain," as used herein, refers to a chain of various versions of the same data, such as version 1, version 2, version 3, . . . version N, where N is a positive integer number, of the same data.

Returning again to FIG. 4, in conjunction with FIGS. 1-3 and 5-7, in operation 404, index version data optimizer 201 of version control system 105 creates a partial hash index adaptively against secondary index(es) 701 so as to point to particular versions in the version chains.

As stated above, in one embodiment, the partial hash index is created based on frequently accessed data thereby avoiding the double index probe (probe operation to retrieve rows of data from both the primary and secondary indexes) for the secondary index and the primary index to improve index access efficiency. As a result, the partial hash index contains entries pertaining to a portion of the primary index.

An illustration of creating such a partial hash index is discussed below in connection with FIG. 8.

Referring to FIG. 8, FIG. 8 illustrates creating a partial hash index adaptively against secondary indexes 701 (FIG. 7) in accordance with an embodiment of the present disclosure.

As shown in FIG. 8, primary index 500 (also referred to as a "clustered index") and secondary index 701 are used to create a partial hash index 801. In one embodiment, as shown in FIG. 8, partial hash index 801 contains entries pertaining to a portion of primary index 500, such as entries 1, 3, 5, 9, ls, sj, ww, and zs. In one embodiment, such entries are created by selecting the one or more columns that are to be stored in the index, such as via the Postgre SQL CREATE INDEX statement.

In one embodiment, partial hash index 801 is an array of N buckets or slots, each one containing a pointer to a row. In one embodiment, partial hash index 801 uses a hash function F(K,N) in which given a key K and the number of buckets N, the function maps the key to the corresponding bucket of the hash index.

Returning to FIG. 4, in conjunction with FIGS. 1-3 and 5-8, in operation 405, index version data optimizer 201 of version control system 105 receives the transaction to read version data in main table 600 (FIG. 6). In one embodiment, such a transaction is generated by database management system 102 (e.g., SQL server) based on the SQL statement(s) received from the user of computing device 101, such as a query received from the user of computing device 101 to read version data from distributed database 104.

As discussed above, in one embodiment, as a result of building partial hash index 801 (FIG. 8), a transaction to read version data in main table 600 may be addressed by using the primary key value in the transaction in connection with partial hash index 801 to point to a particular version of the requested data in the version chains. A "transaction" is used to interact with the data in a database, such as distributed database 104. Whenever data is read or written to distributed database 104, it is performed using a transaction. A "transaction," as used herein, refers to an atomic and durable set of data access and data mutation operations.

In one embodiment, such a transaction groups SQL statements so that they are either all committed, which means they are applied to distributed database 104, or all rolled back, which means they are undone from distributed database 104.

In operation 406, index version data optimizer 201 of version control system 105 identifies the particular version of the requested data in the version chains using the primary key value in the transaction in connection with partial hash index 801 as shown in FIG. 9.

Referring to FIG. 9, FIG. 9 illustrates identifying the particular version of the requested data in the version chains using the primary key value in the transaction in accordance with an embodiment of the present disclosure.

As shown in FIG. 9, secondary index 701 utilizes the primary key (as opposed to the row identifier) as shown in element 901 to identify the head (or beginning) of version chain 902A, 902B. Version chains 902A-902B may collectively or individually be referred to as version chains 902 or version chain 902, respectively. While FIG. 9 illustrates two version chains 902, it is noted that any number of version chains 902 may be utilized.

As discussed above, a "version chain 902," as used herein, refers to a chain of various versions of the same data, such as version 1, version 2, version 3, . . . version N, where N is a positive integer number, of the same data.

Furthermore, as illustrated in FIG. 9, the particular version of the requested data in version chain 902 is identified using the primary key value in the transaction 903 via partial hash index 801. As discussed above, a "transaction" 903, as used herein, refers to an atomic and durable set of data access and data mutation operations.

For example, as illustrated in FIG. 9, based on the primary key value in transaction 903, the head or beginning of version chain 902A, 902B may be identified or the version that is subsequent to the head or beginning of version chain 902B is identified via partial hash index 801. As discussed above, based on the primary key value, the hash function of partial hash index 801 maps the key to the corresponding bucket (e.g., head of version chain 902).

In addition to improving performance of a distributed database by chaining version data bi-directionally in a data page of a main table of a primary index of an index organized table of the distributed database, embodiments of the present disclosure improve the performance of a distributed database by chaining version data bi-directionally in a data page of a main table of a heap organized table of the distributed database as discussed below in connection with FIG. 10.

FIG. 10 is a flowchart of a method 1000 for improving performance of a distributed database by chaining version data bi-directionally in a data page of a main table of a heap organized table of the distributed database in accordance with an embodiment of the present disclosure.

Referring to FIG. 10, in conjunction with FIGS. 1-3, in operation 1001, heap version data optimizer 202 of version control system 105 receives a query, such as from the user of computing device 101, to store version data in distributed database 104. In one embodiment, such a query is a Structured Query Language (SQL) query As discussed above, "version data," as used herein, refers to data that has or possibly can have multiple versions. For example, data stored in distributed database 104 may be collaboratively shared and edited among the users of computing devices 101. As a result, such collaborative data may contain different versions of the data.

Furthermore, a "distributed database," as used herein, refers to an integrated collection of databases that is physically distributed across sites in a computer network.

In operation 1002, heap version data optimizer 202 of version control system 105 stores the version data in a row of a data page of a main table of a heap organized table of distributed database 104, where the row of the data page contains a pointer to a later version of the version data if the later version of the version data is stored in the data page thereby chaining the version data bi-directionally.

As discussed above, a "heap organized table," as used herein, refers to a table with rows stored in no particular order. A heap is a table without a clustered index as opposed to an index organized table (clustered index corresponds to the primary index of the index organized table). One or more non-clustered indexes may be created on tables stored as a heap.

In one embodiment, heap version data optimizer 202 stores version data in the rows of the data page of the main table of the heap organized table of distributed database 104, where such rows may contain pointers to a later version of the version data if the later version of the version data is stored in the data page thereby chaining version data bi-directionally, as illustrated in FIG. 11.

FIG. 11 illustrates an exemplary data page 1102 of main table 1101 of heap organized table 1100 of distributed database 104 (FIG. 1) in accordance with an embodiment of the present disclosure.

Referring to FIG. 11, heap organized table 1100 includes a main table 1101 in which the definition of how the records are stored in main table 1101 is maintained in index 1103. Main table 1101 of heap organized table 1100 includes multiple data pages in main table 1101, including data page 1102.

As shown in FIG. 11, each row of data page 1102 contains entries to store the version data 1104, a key 1105, a value 1106 and a pointer 1107. In one embodiment, such version data 1104 is associated with a key 1105 (e.g., primary key) corresponding to a value stored in entry 1106. In this manner, version data 1104 may be identified by the query providing key 1105. Furthermore, in certain situation, such version data 1104 may include later versions. In such cases, entry 1107 stores a pointer to a later version of the version data stored in that row of data page 1102. For example, version data 1104 Bx+1 that is identified by key 1105 (1002) with the value 1106 of DDDD has a pointer 1107 that points to the later version of such data (Bx+2) as shown in FIG. 11. Similarly, as shown in FIG. 11, version data 1104 Bx that is identified by key 1105 (1002) with the value 1106 of BBBB has a pointer 1107 that points to the later version of such data (Bx+1). In this manner, the version data are chained bi-directionally.

Returning to FIG. 10, in conjunction with FIGS. 1-3 and 11, in operation 1003, heap version data optimizer 202 of version control system 105 compares the minimum active version of the version data with the current version of the version data to avoid duplicate fetch.

As discussed above, the "minimum active version of the version data," as used herein, refers to the lowest version number of the version data that has active transactions. "Active transactions," as used herein, refer to transactions that are currently reading or writing to such version data. The "current data version" or the "current version of the version data," as used herein, refers to the version of the version data that is currently being pointed by the page header of the data page.

For example, if versions 1 and 2 of the version data do not have any active transactions (i.e., no transactions are currently reading or writing to such version data) and version 3 of the version data does have active transactions (i.e., one or more transactions are currently reading or writing to such version data), then version 3 of the version data would correspond to the minimum active version of the version data. Such a version would then be compared with the current version of the version data (i.e., the version of the version data that is currently being pointed by the page header of the data page).

In operation 1004, heap version data optimizer 202 of version control system 105 determines whether the current version of the version data is less than the minimum active version of the version data.

If the current version of the version data is less than the minimum active version of the version data, then, in operation 1005, heap version data optimizer 202 of version control system 105 purges the history version data of the current version of the version data as illustrated in FIG. 12.

Referring to FIG. 12, FIG. 12 illustrates purging the history version data of the current version of the version data in accordance with an embodiment of the present disclosure.

As shown in FIG. 12, in conjunction with FIG. 11, page header 1201 of data page 1102 points to the second version of the version data (version 2 of tuple 1202B) in a row of the data page. A "tuple," as used herein, refers to a single variable that stores multiple items, such as a row in data page 1102.

Furthermore, as shown in FIG. 12, items 1203A-1203B in data page 1102 are used and directed to various stored data. Item 1203C is unused, and hence, is not directed to stored data. Items 1203A-1203C may collectively or individually be referred to as items 1203 or item 1203, respectively. An item 1203, as used herein, refers to a group of attributes that is uniquely identifiable among all of the other items. For example, if data page 1102 is directed to people, then each item 1203 represents a person.

As shown in FIG. 12, item 1203A points to version 1 of the version data (version 1 of tuple 1202A). Hence, the value of item 1203A corresponds to the value of version 1 of tuple 1202A. Furthermore, as shown in FIG. 12, item 1203B points to version 2 of the version data (version 2 of tuple 1202B). Hence, the value of item 1203B corresponds to the value of version 2 of tuple 1202B.

As discussed above, the current version of the version data corresponds to the version of the version data that is currently being pointed by page header 1201 of the data page. Hence, version 2 of the tuple 1202B corresponds to the current version of the version data. Tuples 1202A-1202B may collectively or individually be referred to as tuples 1202 or tuple 1202, respectively.

Additionally, as illustrated in FIG. 12, there is a location for storing "special" data as identified by element 1204.

Furthermore, as illustrated in FIG. 12, there is a timeline 1205 ("time series") which shows the number of active transactions (via their identifiers (IDs). As shown in FIG. 12, there are between 10 and 20 active transactions involving version 3 (V3) of the version data in question. Furthermore, as shown in FIG. 12, version V2 is not being utilized by any active transactions.

As illustrated in FIG. 12, the minimum active version of the version data corresponds to version 3 of the version data. By having the current version of the version data (V2) being less than the minimum active version of the version data (V3), then heap version data optimizer 202 of version control system 105 purges the history version data (version 1 of tuple 1202A) of the current version of version data (e.g., version 2 of tuple 1202B). As discussed above, the "history version data," as used herein, refers to the version data that is a prior version (i.e., older version) than the version data in question (e.g., version 2 of tuple 1202B).

Referring to operation 1004, if, however, the current version of the version data is not less than the minimum active version of the version data, then, in operation 1006, heap version data optimizer 202 of version control system 105 registers the history version data of the current version of the version data in a queue (referred to herein as the "purge queue") to be purged by garbage collector 203, which performs the garbage collection task in the future as long as the purge rule is satisfied (i.e., current version of the version data is less than the minimum active version of the version data).

As discussed above, "history version data," as used herein, refers to the version data that is a prior version (i.e., older version) than the version data in question. Furthermore, as discussed above, in one embodiment, garbage collector 203 is responsible for purging these "registered" versions periodically as long as the purge rule is satisfied.

An illustration of registering the history version data of the current version of the version data in the purge queue is discussed below in connection with FIG. 13.

FIG. 13 illustrates registering the history version data of the current version of the version data in the purge queue in accordance with an embodiment of the present disclosure.

Referring to FIG. 13, page header 1201 of data page 1102 points to the fourth version of the version data (version 4 of tuple 1202D). Furthermore, as shown in FIG. 13, item 1203A points to item 1203C, which is directed to version 3 of the version data (version 3 of tuple 1202C). Hence, the value of items 1203A, 1203C corresponds to the value of version 3 of tuple 1202C. In another example, item 1203B points to the fourth version of the version data (version 4 of tuple 1202D). Hence, the value of item 1203B corresponds to the value of version 4 of tuple 1202D. Furthermore, as discussed above, the "current data version" or "current version of the version data" refers to the version of the version data that is currently being pointed by page header 1201 of the data page. As a result, as shown in FIG. 13, the current version of the version data corresponds to version 4 of tuple 1202D (pointed to by page header 1201). Tuples 1202C-1202D may collectively or individually be referred to as tuples 1202 or tuple 1202, respectively.

Furthermore, as illustrated in FIG. 13, there is a timeline 1301 ("time series") which shows the number of active transactions (via their identifiers (IDs). As shown in FIG. 13, there are between 10 and 20 active transactions involving version 4 (V4) of the version data in question. As a result, since the current version of the version data (V4) is not less than the minimum active version of the version data (V4), then heap version data optimizer 202 of version control system 105 registers the history version data of the current version of the version data (V4), such as version 3 (V3) of tuple 1202C, in a queue (purge queue 1302) to be purged by garbage collector 203, which performs the garbage collec-tion task in the future as long as the purge rule is satisfied (i.e., version of the current version of the version data is less than the minimum active version of the version data). As discussed above, the "history version data" refers to the version data that is associated with a version that is older (i.e., predates) than the version of the version data in question. For example, the history version data of the current version of the version data (version 4 of tuple 1202D) corresponds to the prior version or older version of the current version of the version data, such as version 3 of tuple 1202C. As a result, version 3 of tuple 1202C is registered in queue 1302 to be purged by garbage collector 203.

When such a purge rule is satisfied, garbage collector 203 fetches the history version data (version 3 (V3) of tuple 1202C) of the current version data (version 4 (V4) of tuple 1202D) via a purge task 1303.

In one embodiment, purge queue 1302 corresponds to a data structure stored in a storage device (e.g., memory 305, disk unit 308) of version control system 105.

As a result of the foregoing, embodiments of the present disclosure provide a means for performing database data versioning in a distributed database system without adversely affecting the performance of the distributed database system by chaining version data bi-directionally in a data page of a main table of an organized table (e.g., index organized table, heap organized table) of the distributed database thereby avoiding additional version data accesses with synchronous input/output and network overhead.

Furthermore, the principles of the present disclosure improve the technology or technical field involving distributed database systems. As discussed above, database data versioning in a distributed database system negatively affects the performance of the distributed database due to the additional and redundant read operations against the version data, such as redundant read operations against multiple databases which may involve reading multiple logs with a certain rage specified. Furthermore, the distributed database system may utilize a bitemporal table for the loaded version data when performing database data versioning. A bitemporal table is a table that combines the historical tracking of a system-period temporal table with the time-specific data storage capabilities of an application-period temporal table. However, a drawback with using such a bitemporal table is the required additional or double access against the bitemporal table, such as reading and writing to the bitemporal table. Furthermore, synchronous input/output may be needed. Hence, by performing database data versioning in a distributed database system, additional and redundant read operations against the version data, additional or double access against a bitemporal table and/or synchronous input/output may be required thereby adversely affecting the performance of the distributed database system.

Embodiments of the present disclosure improve such technology by receiving a query (e.g., Structured Query Language (SQL) query) to store version data in the distributed database, where the distributed database includes an integrated collection of databases that is physically distributed across sites in a computer network. "Version data," as used herein, refers to data that has or possibly can have multiple versions. Upon receiving the query to store the version data, the version data is stored in a row of a data page of a main table of a heap organized table of the distributed database, where the row of the data page of the main table of the heap organized table of the distributed database contains a pointer pointing to a later version of the version data in response to the later version of the version data being stored in the data page thereby chaining version data bi-directionally. In this manner, database data versioning may be performed in the distributed database system without adversely affecting the performance of the distributed database system by chaining the version data bi-directionally in the data page thereby avoiding additional version data accesses with synchronous input/output and network overhead. Furthermore, in this manner, there is an improvement in the technical field involving distributed database systems.

Furthermore, embodiments of the present disclosure improve such technology by receiving a query (e.g., Structured Query Language (SQL) query) to store version data in the distributed database, where the distributed database includes an integrated collection of databases that is physically distributed across sites in a computer network. Upon receiving the query to store the version data, the version data is stored in a row of a data page of a main table of a primary index of an index organized table of the distributed database, where the row of the data page of the main table of the primary index of the index organized table of the distributed database contains a pointer pointing to a previous version of the version data in response to the previous version of the version data being stored in the data page thereby chaining version data bi-directionally. In this manner, database data versioning may be performed in the distributed database system without adversely affecting the performance of the distributed database system by chaining the version data bi-directionally in the data page thereby avoiding additional version data accesses with synchronous input/output and network overhead. Furthermore, in this manner, there is an improvement in the technical field involving distributed database systems.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

In one embodiment of the present disclosure, a computer-implemented method for improving performance of a distributed database comprises receiving a query to store version data in the distributed database, where the distributed database comprises an integrated collection of databases that is physically distributed across sites in a computer network. The method further comprises storing the version data in a row of a data page of a main table of a heap organized table of the distributed database, where the row of the data page of the main table of the heap organized table of the distributed database contains a pointer pointing to a later version of the version data in response to the later version of the version data being stored in the data page thereby chaining version data bi-directionally.

In one embodiment of the present disclosure, the method further comprises comparing a minimum active version of the version data with a current version of the version data, where the minimum active version of the version data corresponds to a lowest version number of the version data with active transactions.

Furthermore, in one embodiment of the present disclosure, the method further comprises purging history version data of the current version of the version data in response to a version of the current version of the version data being less than the minimum active version of the version data.

Additionally, in one embodiment of the present disclosure, the method further comprises registering history version data of the current version of the version data in a queue in response to a version of the current version of the version data not being less than the minimum active version of the version data.

Furthermore, in one embodiment of the present disclosure, the method further comprises having the history version data of the current version of the version data be registered in the queue to be purged.

Additionally, in one embodiment of the present disclosure, the method further comprises having the history version data of the current version of the version data be purged by a garbage collection task.

In one embodiment of the present disclosure, the method further comprises having the row of the data page of the main table of the heap organized table of the distributed database contain entries to store the version data, a key, a value and the pointer to point to the later version of the version data.

Other forms of the embodiments of the method described above are in a system and in a computer program product.

In one embodiment of the present disclosure, a computer-implemented method for improving performance of a distributed database comprises receiving a query to store version data in the distributed database, where the distributed database comprises an integrated collection of databases that is physically distributed across sites in a computer network. The method further comprises storing the version data in a row of a data page of a main table of a primary index of an index organized table of the distributed database, where the row of the data page of the main table of the primary index of the index organized table of the distributed database contains a pointer pointing to a previous version of the version data in response to the previous version of the version data being stored in the data page thereby chaining version data bi-directionally.

Furthermore, in one embodiment of the present disclosure, the method further comprises replacing a row identifier in a secondary index with a primary key value which points to a beginning of a version chain.

Additionally, in one embodiment of the present disclosure, the method further comprises creating a partial hash index adaptively against the secondary index.

Furthermore, in one embodiment of the present disclosure, the method additionally comprises having the partial hash index contain entries pertaining to a portion of the primary index.

Additionally, in one embodiment of the present disclosure, the method further comprises receiving a transaction to read the version data stored in the main table of the primary index of the index organized table of the distributed database. The method further comprises identifying a version in a version chain to read the version data using the partial hash index.

In one embodiment of the present disclosure, the method further comprises having the row of the data page of the main table of the primary index of the index organized table of the distributed database contain entries to store the version data, a key, a value and the pointer to point to the previous version of the version data.

Other forms of the embodiments of the method described above are in a system and in a computer program product.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for improving performance of a distributed database, the method comprising:
   receiving a query to store version data in said distributed database, wherein said distributed database comprises an integrated collection of databases that is physically distributed across sites in a computer network; and
   storing said version data in a row of a data page of a main table of a heap organized table of said distributed database, wherein said row of said data page of said main table of said heap organized table of said distributed database contains a pointer pointing to a later version of said version data in response to said later version of said version data being stored in said data page.

2. The method as recited in claim 1 further comprising:
   comparing a minimum active version of said version data with a current version of said version data, wherein said minimum active version of said version data corresponds to a lowest version number of said version data with active transactions.

3. The method as recited in claim 2 further comprising:
   purging history version data of said current version of said version data in response to a version of said current version of said version data being less than said minimum active version of said version data.

4. The method as recited in claim 2 further comprising:
   registering history version data of said current version of said version data in a queue in response to a version of said current version of said version data not being less than said minimum active version of said version data.

5. The method as recited in claim 4, wherein said history version data of said current version of said version data is registered in said queue to be purged.

6. The method as recited in claim 5, wherein said history version data of said current version of said version data is purged by a garbage collection task.

7. The method as recited in claim 1, wherein said row of said data page of said main table of said heap organized table of said distributed database contains entries to store said version data, a key, a value and said pointer to point to said later version of said version data.

8. A computer program product for improving performance of a distributed database, the computer program product comprising one or more computer readable storage mediums having program code embodied therewith, the program code comprising programming instructions for:
   receiving a query to store version data in said distributed database, wherein said distributed database comprises an integrated collection of databases that is physically distributed across sites in a computer network; and
   storing said version data in a row of a data page of a main table of a heap organized table of said distributed database containing a pointer pointing to a later version of said version data.

9. The computer program product as recited in claim 8, wherein the program code further comprises the programming instructions for:
   comparing a minimum active version of said version data with a current version of said version data, wherein said minimum active version of said version data corresponds to a lowest version number of said version data with active transactions.

10. The computer program product as recited in claim 9, wherein the program code further comprises the programming instructions for:
    purging history version data of said current version of said version data in response to a version of said current version of said version data being less than said minimum active version of said version data.

11. The computer program product as recited in claim 9, wherein the program code further comprises the programming instructions for:
    registering history version data of said current version of said version data in a queue in response to a version of said current version of said version data not being less than said minimum active version of said version data.

12. The computer program product as recited in claim 11, wherein said history version data of said current version of said version data is registered in said queue to be purged.

13. The computer program product as recited in claim 12, wherein said history version data of said current version of said version data is to be purged by a garbage collection task.

14. The computer program product as recited in claim 8, wherein said row of said data page of said main table of said heap organized table of said distributed database contains entries to store said version data, a key, a value and said pointer to point to said later version of said version data.

15. A computer-implemented method for improving performance of a distributed database, the method comprising:
    receiving a query to store version data in said distributed database, wherein said distributed database comprises an integrated collection of databases that is physically distributed across sites in a computer network; and
    storing said version data in a row of a data page of a main table of a primary index of an index organized table of said distributed database, wherein said row of said data page of said main table of said primary index of said index organized table of said distributed database contains a pointer pointing to a previous version of said version data in response to said previous version of said version data being stored in said data page.

16. The method as recited in claim 15 further comprising:
    replacing a row identifier in a secondary index with a primary key value which points to a beginning of a version chain.

17. The method as recited in claim 16 further comprising:
    creating a partial hash index adaptively against said secondary index.

18. The method as recited in claim 17, wherein said partial hash index contains entries pertaining to a portion of said primary index.

19. The method as recited in claim 18 further comprising:
    receiving a transaction to read said version data stored in said main table of said primary index of said index organized table of said distributed database; and
    identifying a version in a version chain to read said version data using said partial hash index.

20. The method as recited in claim 15, wherein said row of said data page of said main table of said primary index of said index organized table of said distributed database contains entries to store said version data, a key, a value and said pointer to point to said previous version of said version data.

* * * * *